United States Patent
Ueda et al.

(10) Patent No.: US 9,817,768 B2
(45) Date of Patent: Nov. 14, 2017

(54) STORAGE SYSTEM AND DATA STORING METHOD

(71) Applicant: Hitachi, Ltd., Chiyoda-ku, Tokyo (JP)

(72) Inventors: Keisuke Ueda, Tokyo (JP); Go Uehara, Tokyo (JP); Kenta Ninose, Tokyo (JP); Hiroshi Hirayama, Tokyo (JP)

(73) Assignee: HITACHI, LTD., Tokyo (JP)

( * ) Notice: Subject to any disclaimer, the term of this patent is extended or adjusted under 35 U.S.C. 154(b) by 21 days.

(21) Appl. No.: 14/773,116

(22) PCT Filed: Oct. 10, 2013

(86) PCT No.: PCT/JP2013/077590
§ 371 (c)(1),
(2) Date: Sep. 4, 2015

(87) PCT Pub. No.: WO2015/052811
PCT Pub. Date: Apr. 16, 2015

(65) Prior Publication Data
US 2016/0019159 A1  Jan. 21, 2016

(51) Int. Cl.
*G06F 3/06* (2006.01)
*G06F 12/10* (2016.01)
(Continued)

(52) U.S. Cl.
CPC ............... *G06F 12/10* (2013.01); *G06F 3/06* (2013.01); *G06F 3/0608* (2013.01);
(Continued)

(58) Field of Classification Search
CPC ......... G06F 12/0246; G06F 2212/7202; G06F 2212/7204
See application file for complete search history.

(56) References Cited

U.S. PATENT DOCUMENTS

2008/0046675 A1  2/2008 Okada et al.
2009/0287878 A1  11/2009 Yamamoto et al.
(Continued)

FOREIGN PATENT DOCUMENTS

JP  2005-196609 A  7/2005
JP  2009-301525 A  12/2009
(Continued)

OTHER PUBLICATIONS

PCT International Search Report on application PCT/JP2013/077590 dated Nov. 12, 2013; 5 pages.
(Continued)

*Primary Examiner* — Edward Dudek, Jr.
(74) *Attorney, Agent, or Firm* — Foley & Lardner LLP

(57) ABSTRACT

Provided is a storage system including: a storage medium including a plurality of physical storage areas having an upper limit number of rewrites, and a medium controller that controls I/O (input/output) of data to/from the plurality of physical storage areas; and a storage controller connected to the storage medium, wherein when any of the physical storage areas is not allocated to a write destination logical storage area among a plurality of logical storage areas, the medium controller allocates a vacant physical storage area among the plurality of physical storage areas to the write destination logical storage area and writes write target data to the allocated vacant physical storage area, and the plurality of logical storage areas includes an available logical area group determined based on a relationship between an available capacity of a logical storage capacity and a rewrite frequency of the plurality of physical storage areas.

8 Claims, 21 Drawing Sheets

(51) Int. Cl.
　　　*G06F 3/08*　　　(2006.01)
　　　*G06F 12/02*　　(2006.01)

(52) U.S. Cl.
　　　CPC .......... *G06F 3/0616* (2013.01); *G06F 3/0631* (2013.01); *G06F 3/0653* (2013.01); *G06F 3/0689* (2013.01); *G06F 3/08* (2013.01); *G06F 12/0246* (2013.01); *G06F 2212/65* (2013.01); *G06F 2212/7202* (2013.01); *G06F 2212/7204* (2013.01)

(56) References Cited

U.S. PATENT DOCUMENTS

| | | |
|---|---|---|
| 2010/0030946 A1 | 2/2010 | Kano et al. |
| 2010/0262765 A1* | 10/2010 | Cheon ................... G06F 3/0613 711/103 |
| 2011/0099320 A1* | 4/2011 | Lucas ................... G06F 3/0616 711/103 |
| 2013/0086304 A1 | 4/2013 | Ogawa et al. |

FOREIGN PATENT DOCUMENTS

| | | |
|---|---|---|
| JP | 2010-033393 A | 2/2010 |
| JP | 2012-058770 A | 3/2012 |
| WO | WO 2013/046464 A1 | 4/2013 |

OTHER PUBLICATIONS

PCT Written Opinion on application PCT/JP2013/077590 dated Nov. 12, 2013; with partial English translation; 8 pages.

\* cited by examiner

Fig. 9

| | | 220 Drive management table | | |
|---|---|---|---|---|
| 221 | 222 | | 223 | 224 |
| Drive number | Drive type | | Maximum capacity | Available capacity |
| 1 | SSD(SLC) | | 800GB | 800GB |
| 2 | SSD(MLC) | | 800GB | 800GB |
| 3 | FMPK | | 1.6TB | 1TB |
| ... | ... | | | |
| N | HDD | | 500GB | 500GB |

Fig. 10

Pool management table 240

| Pool number 241 | RAID group number 242 | RAID level 243 | RAID configuration 244 | Drive number 245 | Maximum capacity 246 | Available capacity 247 |
|---|---|---|---|---|---|---|
| 1 | 1 | RAID5 | 3D+1P | 1 | 800GB | 800GB |
| | | | | 2 | 800GB | 800GB |
| | | | | 14 | 800GB | 800GB |
| | | | | 15 | 800GB | 800GB |
| | 2 | RAID5 | 2D+1P | 3 | 800GB | 500GB |
| | | | | 4 | 800GB | 500GB |
| | | | | 5 | 800GB | 500GB |
| | N | RAID1 | 1D+1D | 10 | 500GB | 500GB |
| | | | | 11 | 500GB | 500GB |

Fig. 11

Chunk management table 300

| RAID group number 301 | Chunk number 302 | Size 303 | Status 304 | Rewrite frequency 305 |
|---|---|---|---|---|
| 1 | 1 | 1GB | Allocated | High |
| 1 | 2 | 1GB | Allocated | Low |
| 1 | ... | ... | ... | ... |
| 1 | N | 1GB | Allocated | Low |
| 2 | 1 | 1GB | Allocated | Low |
| 2 | ... | ... | ... | ... |
| 2 | N | 1GB | Not allocated | - |
| N | 1 | 1GB | Not allocated | - |
| N | ... | ... | ... | ... |
| N | N | 1GB | Not allocated | - |

Fig. 12

Virtual volume management table (260)

| Virtual volume number (261) | Pool number (262) | Maximum virtual capacity (263) | Virtual chunk number (264) | RAID group number (265) | Chunk number (266) | Rewrite frequency (267) |
|---|---|---|---|---|---|---|
| 1 | 1 | 800GB | 1 | 1 | 1 | High |
|   |   |   | 2 | 1 | 100 |   |
|   |   |   | 3 | 1 | 3 |   |
|   |   |   | ... | 2 |   |   |
|   |   |   | N | 2 | 101 |   |
| 2 | 1 | 800GB | 1 | 1 | 1 | Low |
|   |   |   | 2 | 1 | 2 |   |
|   |   |   | ... | 2 |   |   |
|   |   |   | N | 3 | 103 |   |

Fig. 13

| Individual drive management table 320 | | | | | |
|---|---|---|---|---|---|
| Drive number 321 | Maximum capacity 322 | Available capacity 323 | LBA 324 | LBA length 325 | Chunk number 326 |
| 3 | 1.6TB | 1TB | 0 | 1GB | 1 |
| | | | 2097152 | 1GB | 100 |
| | | | 4194304 | 1GB | 4 |
| | | | ... | ... | |
| | | | N | 1GB | Not available |

Fig. 15

Logical-physical conversion table — 520

| LBA — 561 | Logical page number — 562 | Logical page size — 563 | Status — 564 | Block number — 565 | Page number — 566 |
|---|---|---|---|---|---|
| 0 | 1 | 16KB | Valid | 1 | 1 |
| 8192 | 2 | 16KB | Valid | 1 | 2 |
| 16384 | 3 | 16KB | Invalid | N/A | N/A |
| 24576 | 4 | 16KB | Invalid | - | - |
| ... | ... | ... | ... | ... | ... |
| n | n | 16KB | Not available | n | n |

STORAGE SYSTEM AND DATA STORING METHOD

TECHNICAL FIELD

The present invention relates to the technique of a storage system and a data storing method.

BACKGROUND ART

In flash memories, it is generally necessary to erase data from an area in which data is stored in order to rewrite the data, and there is therefore an upper limit in the number of data rewrites (that is, the number of erasures). Thus, it may be unable to write new data to a flash memory in which the number of rewrites exceeds the upper limit, and the probability that an error occurs in the written data may increase. The time elapsed until the number of rewrites of a flash memory reaches its upper limit is referred to as "lifetime" of the flash memory. Thus, an FMPK (Flash Memory Package) formed of a plurality of flash memories has also its lifetime.

PTL 1 discloses a technique of dividing a storage area of an FMPK into a write area and a user area of a fixed size, setting an LDEV (Logical Device) which is a plurality of logical storage devices to the user area, and changing the size of a write area allocated to the LDEV according to the frequency of writes to the LDEV.

CITATION LIST

Patent Literature

[PTL 1] Japanese Patent Application Publication No. 2010-033393

SUMMARY OF INVENTION

Technical Problem

In general, when data having a high rewrite frequency is stored in a storage medium having an upper limit number of rewrites like flash memories, the lifetime of the storage medium decreases. Storage apparatuses are used for various purposes. For example, in a storage apparatus which is used for storing data having a low rewrite frequency (mainly used for reading data), the lifetime of the storage medium does not decrease. However, according to the technique of PTL 1, since a write area is secured in advance in such a case, it is difficult to increase a logical storage capacity. That is, in such a case, the write area reserved in advance becomes a useless area.

Therefore, an object of the present invention is to realize a storage system and a data storing method capable of maintaining satisfactory balance between the lifetime and logical storage capacity of a storage medium having an upper limit number of rewrites like flash memories.

Solution to Problem

A storage system according to an embodiment of the present invention includes a storage medium including a plurality of physical storage areas each having an upper limit number of rewrites, and a medium controller that controls I/O (input/output) of data to/from the plurality of physical storage areas; and a storage controller connected to the storage medium. When data is erased from each physical storage area in order to rewrite data stored therein, the number of rewrites increases and the physical storage area is regarded as a vacant physical storage area.

When any of the physical storage areas is not allocated to a write destination logical storage area among a plurality of logical storage areas or when a vacant area in which write target data can be stored is not present in a physical storage area allocated to the write destination logical storage area, the medium controller allocates a vacant physical storage area among the plurality of physical storage areas to the write destination logical storage area and writes the write target data to the allocated vacant physical storage area.

The plurality of logical storage areas includes an available logical area group determined based on a relationship between an available capacity of a logical storage capacity and a rewrite frequency of the plurality of physical storage areas. The logical storage capacity is a total capacity of the plurality of logical storage areas. The available logical area group is one or more logical storage areas that can be used as the write destination logical storage area among the plurality of logical storage areas. The available capacity is a capacity of an available logical area group which is one or more logical storage areas that can be used as the write destination logical storage area among the plurality of logical storage areas.

Advantageous Effects of Invention

According to the present invention, it is possible to realize a storage system and a data storing method capable of maintaining satisfactory balance between the lifetime and logical storage capacity of a storage medium having an upper limit number of rewrites.

BRIEF DESCRIPTION OF DRAWINGS

FIG. 9 illustrates a configuration example of a drive management table.

FIG. 10 illustrates a configuration example of a pool management table.

FIG. 11 illustrates a configuration example of a chunk management table.

FIG. 12 illustrates a configuration example of a virtual volume management table.

FIG. 13 illustrates a configuration example of an individual drive management table.

FIG. 15 illustrates a configuration example of a logical-physical conversion table.

DESCRIPTION OF EMBODIMENTS

Hereinafter, an embodiment will be described with reference to the drawings using an FMPK (Flash Memory Package) as an example of a storage medium having an upper limit number of rewrites.

In the following description, various items of information may be described with the use of an expression of "aaa table" or the like. However, these items of information may be expressed in expressions other than a data structure such as a table. Thus, an "aaa table" may be referred to as "aaa information" or the like in order to indicate that the information does not depend on a data structure.

Moreover, although identification information is often expressed in "number", "name" and the like, other types of identification information may be used.

Further, in the following description, "program" may be used as a subject. However, a processor may be used as a subject since a program performs a specified process using a memory and a communication port (network I/F) by being executed by a processor. Moreover, a process disclosed using a program as a subject may be a process executed by a computer such as a monitoring system. Further, a part or all of the program may be realized by dedicated hardware. Furthermore, various types of programs may be installed in each computer by a program distribution server or a computer-readable storage medium.

<Storage System>

Figure 1:
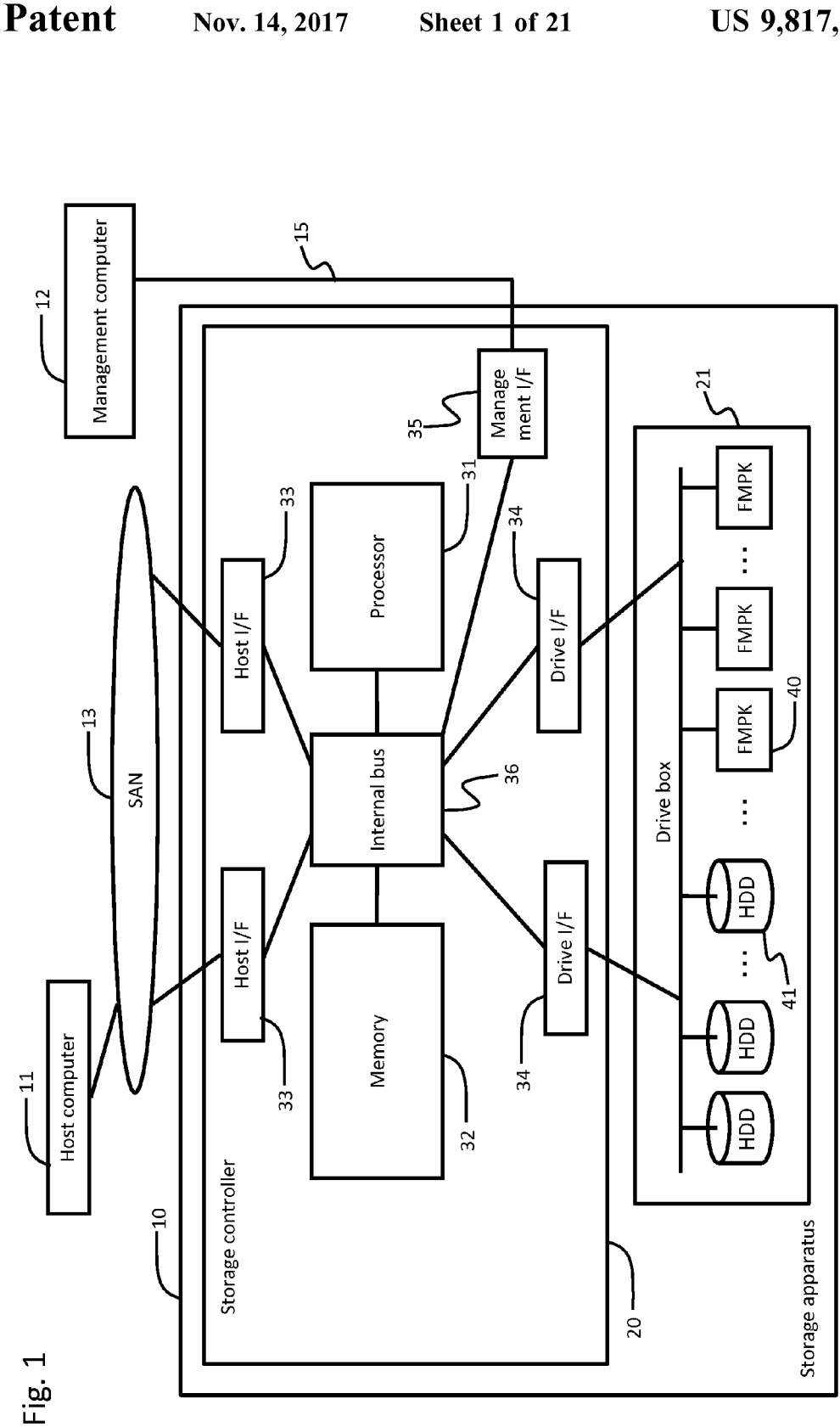
FIG. 1 illustrates a configuration example of a storage system.

FIG. 1 illustrates a configuration example of a storage system. The storage system includes a host computer 11, a management computer 12, and a storage apparatus 10. The host computer 11 and the storage apparatus 10 are connected by a communication network such as, for example, a SAN (Storage Area Network) 13. The management computer 12 and the storage apparatus 10 are connected by a predetermined communication line 15, for example.

The host computer 11 writes data to the storage apparatus 10 by transmitting a write request to the storage apparatus 10. The host computer 11 reads data from the storage apparatus 10 by transmitting a read request to the storage apparatus 10.

The management computer 12 is an apparatus for allowing a user to manage and control the storage apparatus 10. The management computer 12 may include an input device such as a keyboard and a mouse and an output device such as a display.

The storage apparatus 10 includes a storage controller 20 and a drive box 21. The drive box 21 includes a plurality of FMPKs 40. The drive box 21 may further include an HDD (Hard Disk Drive) 41.

The storage controller 20 includes a host I/F 33, a processor 31, a memory 32, a drive I/F 34, and a management I/F 35, and these elements 31 to 35 are connected by a internal bus 36 capable of transmitting and receiving data.

The host I/F 33 is an I/F for connecting the storage controller 20 to the SAN 13. The management I/F 35 is an I/F for connecting the storage controller 20 and the management computer 12.

The processor 31 executes a computer program (hereinafter referred to as a "program") and the like. When a processor executes a program, various functions of the storage apparatus 10 are realized.

The memory 32 stores data. For example, the memory 32 may be a volatile semiconductor memory formed of a DRAM (Dynamic Random Access Memory) or the like and may be a nonvolatile semiconductor memory formed of a flash memory or the like. The programs and data stored in the memory 32 are accessed from the processor 31, the host I/F 33, the drive I/F 34, and the like.

The drive I/F 34 is an I/F for connecting the storage controller 20 to the FMPK 40 and the HDD 41.

Figure 2:
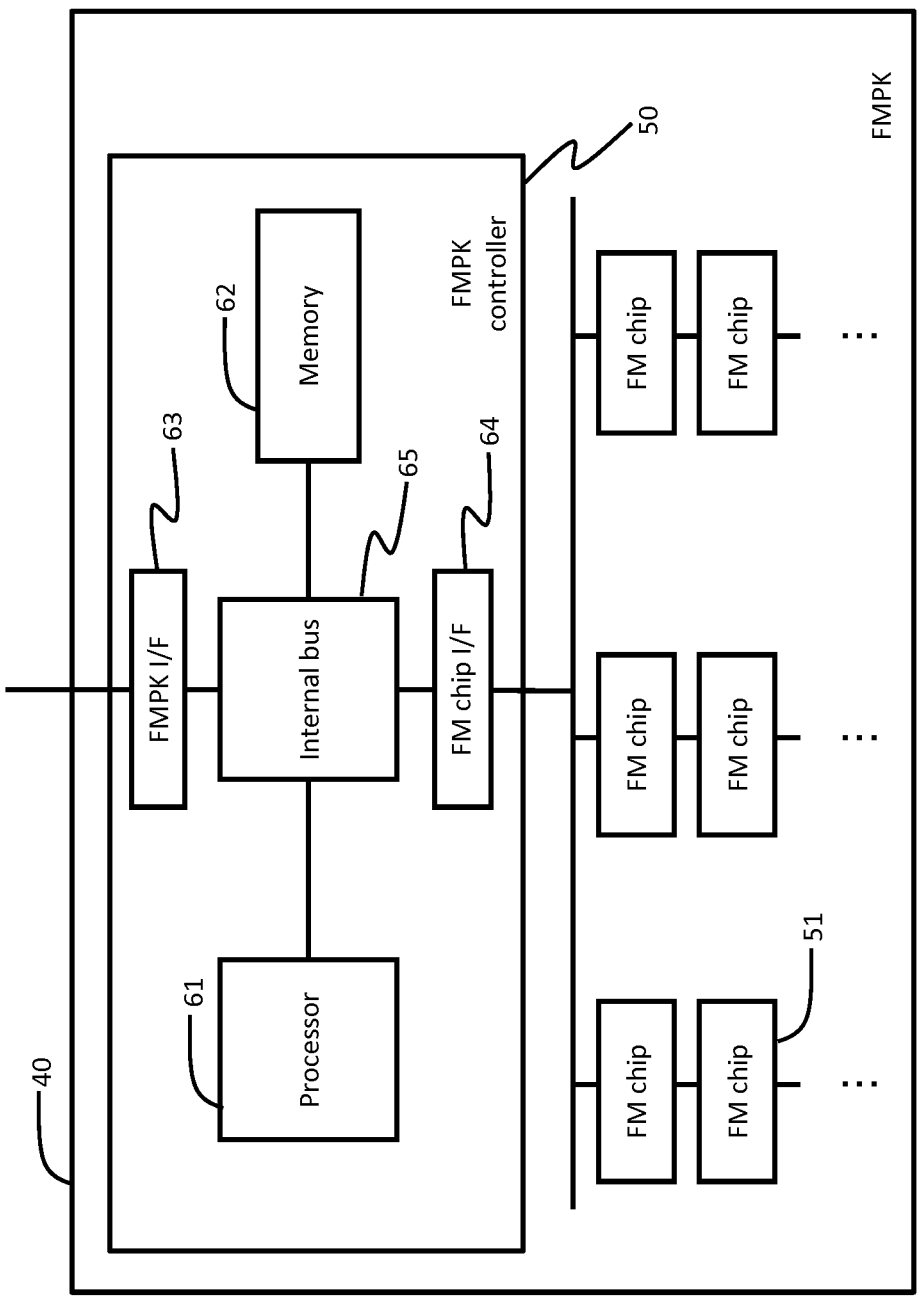
FIG. 2 illustrates a configuration example of an FMPK.

FIG. 2 illustrates a configuration example of the FMPK 40. The FMPK 40 includes an FMPK controller 50 and a plurality of FM chips 51.

The FMPK controller 50 includes a processor 61, a memory 62, an FMPK I/F 63, and an FM chip I/F 64. These elements 61 to 64 are connected by an internal bus 65 capable of transmitting and receiving data and thus can transmit and receive data bidirectionally.

The processor 61 executes programs and the like. When the processor 61 executes a program, various functions of the FMPK 40 are realized.

The memory 62 stores data. The memory may be a volatile semiconductor memory formed of a DRAM or the like and may be a nonvolatile semiconductor memory formed of a flash memory or the like. The programs and data stored in the memory 62 are accessed from the processor 61, the FMPK I/F 63, the FM chip I/F 64, and the like.

The FMPK I/F 63 is an I/F for connecting the FMPK 40 and the storage controller 20. The FM chip I/F 64 is an I/F for connecting the FMPK controller 50 (processor) and the FM chip 51.

Figure 3:
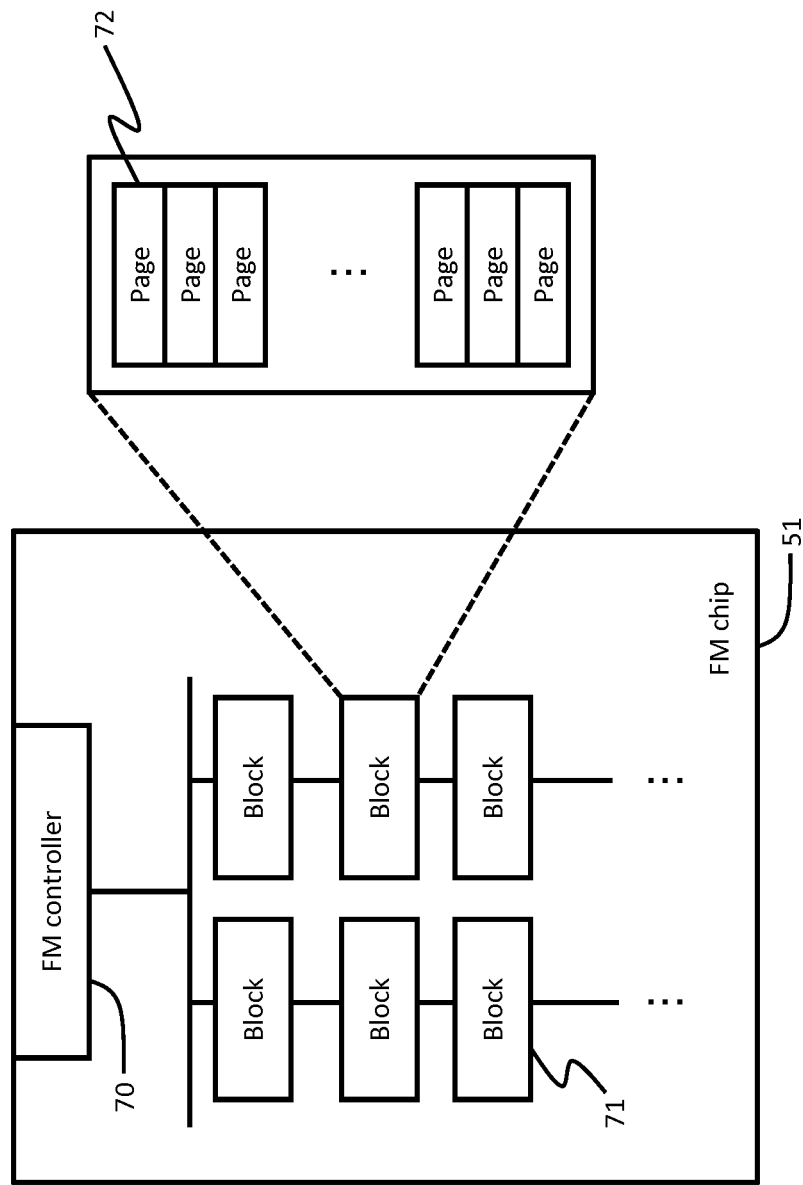
FIG. 3 illustrates a configuration example of an FM (Flash Memory) chip.

FIG. 3 illustrates a configuration example of the FM chip 51. The FM chip 51 is a NAND FM chip, for example, and includes an FM controller 70 and a plurality of blocks 71. The block 71 includes a plurality of pages 72. The FM chip 51 needs to read and write data in units of pages due to its characteristics. Moreover, the FM chip 51 needs to erase data in units of blocks due to its characteristics.

Moreover, the FM chip 51 cannot overwrite data to a page to which data has been written. Thus, when data is overwritten to a page to which data has been written, the FMPK controller 50 writes overwrite data to a non-used page and disables access to the original written page. The data to which access is disabled is erased when a block to which the page belongs is erased.

New data cannot be written to a page (block) in which a predetermined number of writes and erasures (that is, rewrites) have been executed. This means that the page (block) has reached its lifetime. Thus, a page (block) having a high rewrite frequency has a short lifetime. Thus, by averaging the rewrite frequencies of respective pages (blocks) of the entire FMPK 40, it is possible to prevent a specific page (block) only from reaching its lifetime earlier than the other pages (blocks).

Furthermore, as illustrated in the present embodiment, when a surplus capacity secured as a non-used capacity is increased, the rewrite frequency of each page (block) decreases further. That is, it is possible to extend the lifetime of the entire FMPK 40.

<Overview>

Next, an overview of three patterns illustrated in the present embodiment will be described.

Figure 4:
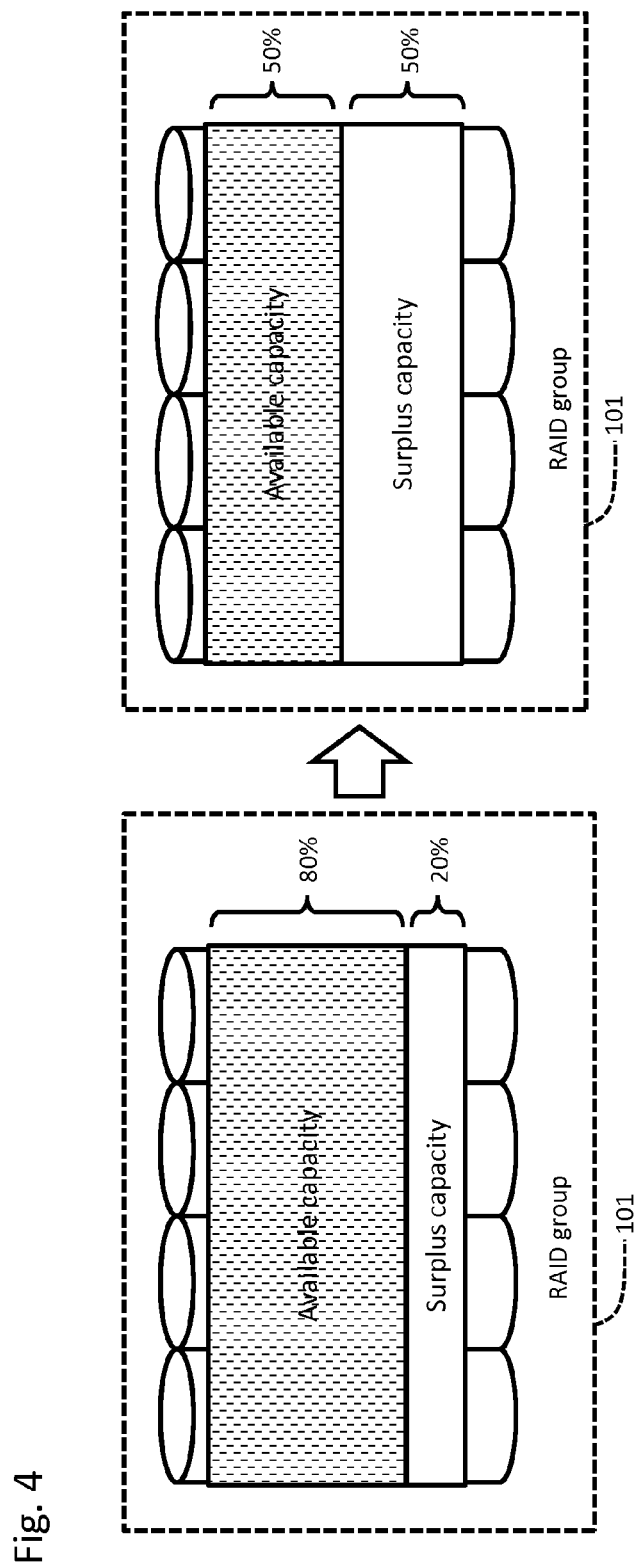
FIG. 4 is a schematic diagram illustrating a case where a surplus capacity is set to a RAID (Redundant Arrays of Inexpensive Disks) group.

FIG. 4 is a schematic diagram illustrating a case where a surplus capacity is set to a RAID group.

A RAID group 101 includes a plurality of FMPKs 40. For example, when the RAID group 101 having the RAID 5 configuration of "3D+1P" is configured using four FMPKs 40, the RAID group 101 provides a storage capacity corresponding to the sum of three FMPKs 40 (the storage capacity of one FMPK 40 is used for parity data).

The storage controller 20 assumes that "(Total storage capacity of RAID group)=(Available capacity)+(Surplus capacity)" and sets the proportions of the available capacity and the surplus capacity to the total storage capacity of the RAID group 101. An amount of data up to the available capacity can be stored in the RAID group 101. In other words, an amount of data larger than the available capacity cannot be stored in the RAID group 101.

Here, although the available capacity decreases if the surplus capacity is increased, the lifetime of the FMPKs 40 that form the RAID group 101 is extended accordingly. This is because, if the surplus capacity is increased, the average number of rewrites per block of the FM chip 51 when a predetermined number of writes were executed on the RAID group 101 decreases.

Conversely, although the available capacity increases if the surplus capacity is decreased, the lifetime of the FMPKs 40 that form the RAID group 101 decreases accordingly. This is because, if the surplus capacity is decreased, the average number of rewrites per block of the FM chip 51 when a predetermined number of writes were executed on the RAID group increases.

Thus, when it is expected that the rewrite frequency is high, the lifetime of the FMPK 40 can be extended by configuring the RAID group 101 so as to have a large surplus capacity. When it is expected that the rewrite frequency is low, a large available capacity can be reserved by configuring the RAID group 101 so as to have a small surplus capacity.

That is, when it is desired to increase the total number of rewrites (to extend the lifetime) to a volume based on a RAID group, the storage controller 20 sets the available capacity and the surplus capacity so that the difference between the available capacity and the surplus capacity decreases to thereby configure the RAID group. That is, the number of rewritable times of a volume (available capacity) increases if the volume is small whereas the number of rewritable times of a volume (available capacity) decreases if the volume is large.

A user can set the surplus capacity when configuring the RAID group 101. The surplus capacity may be set by inputting the size of an available capacity or a surplus capacity or by inputting the proportions (for example, "80%: 20%" or the like) of the available capacity and the surplus capacity to the total storage capacity of a RAID group.

Alternatively, the storage controller 20 may allow a user to select whether a rewrite frequency is "High" or "Low" from the purpose of using the RAID group 101. A predetermined larger surplus capacity may be set when the rewrite frequency of "High" is selected, and a predetermined smaller surplus capacity may be set when the rewrite frequency of "Low" is selected. For example, the storage controller 20 may display a GUI described below.

Figure 5:
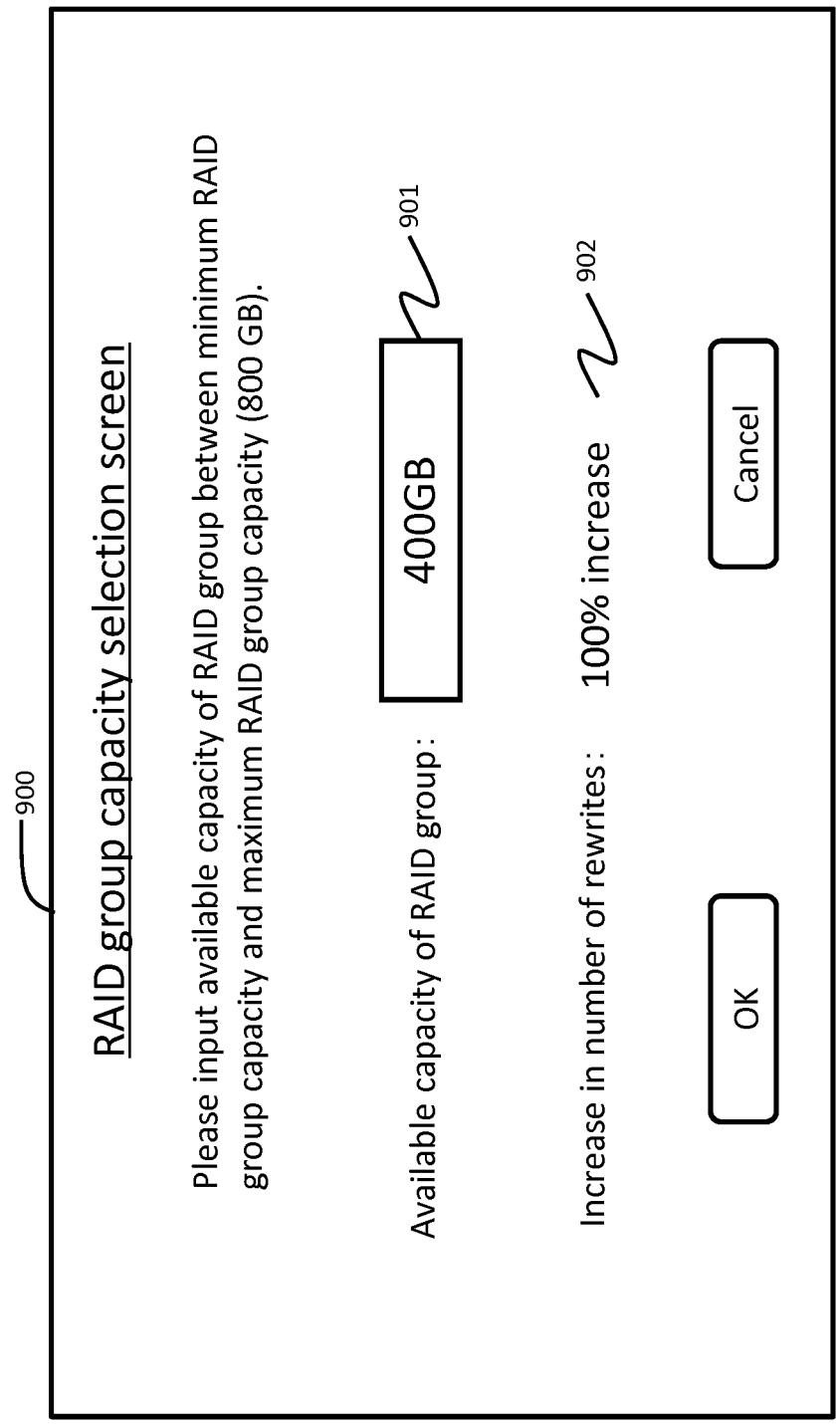
FIG. 5 illustrates a configuration example of a GUI (Graphical User Interface) for setting an available capacity of a RAID group.

FIG. 5 illustrates a configuration example of a GUI for setting the available capacity of the RAID group 101.

The storage controller 20 displays such a GUI 900 as illustrated in FIG. 5 on the management computer 12 when configuring the RAID group 101. The GUI 900 includes an input area 901 in which the available capacity of the RAID group 101 is input and a display area 902 in which the increase in the number of rewrites is displayed.

The storage controller 20 calculates the increase in the number of rewrites based on the available capacity input in the input area 901 and displays a calculation result in the display area 902. The increase in the number of rewrites increases as the input available capacity decreases. Conversely, the increase in the number of rewrites decreases as the input available capacity increases.

The increase in the number of rewrites may be calculated, for example, as "[(Maximum available capacity of RAID group)/(Input available capacity of RAID group)−1]× 100%]". For example, when the maximum available capacity of the RAID group is input to the input area 901, "0% increase" is displayed in the display area 902 for displaying the increase in the number of rewrites. For example, when a value half the maximum available capacity of the RAID group is input to the input area 921, "100% increase" is displayed in the display area 902 for displaying the increase in the number of rewrites (that is, the lifetime is extended twice the conventional one). The management computer 12 may execute the processes of generating the GUI 900 and calculating the increase in the number of rewrites.

As a result, the user can set an appropriate available capacity of the RAID group while monitoring the balance between the lifetime and the available capacity of the FMPK 40.

Figure 6:
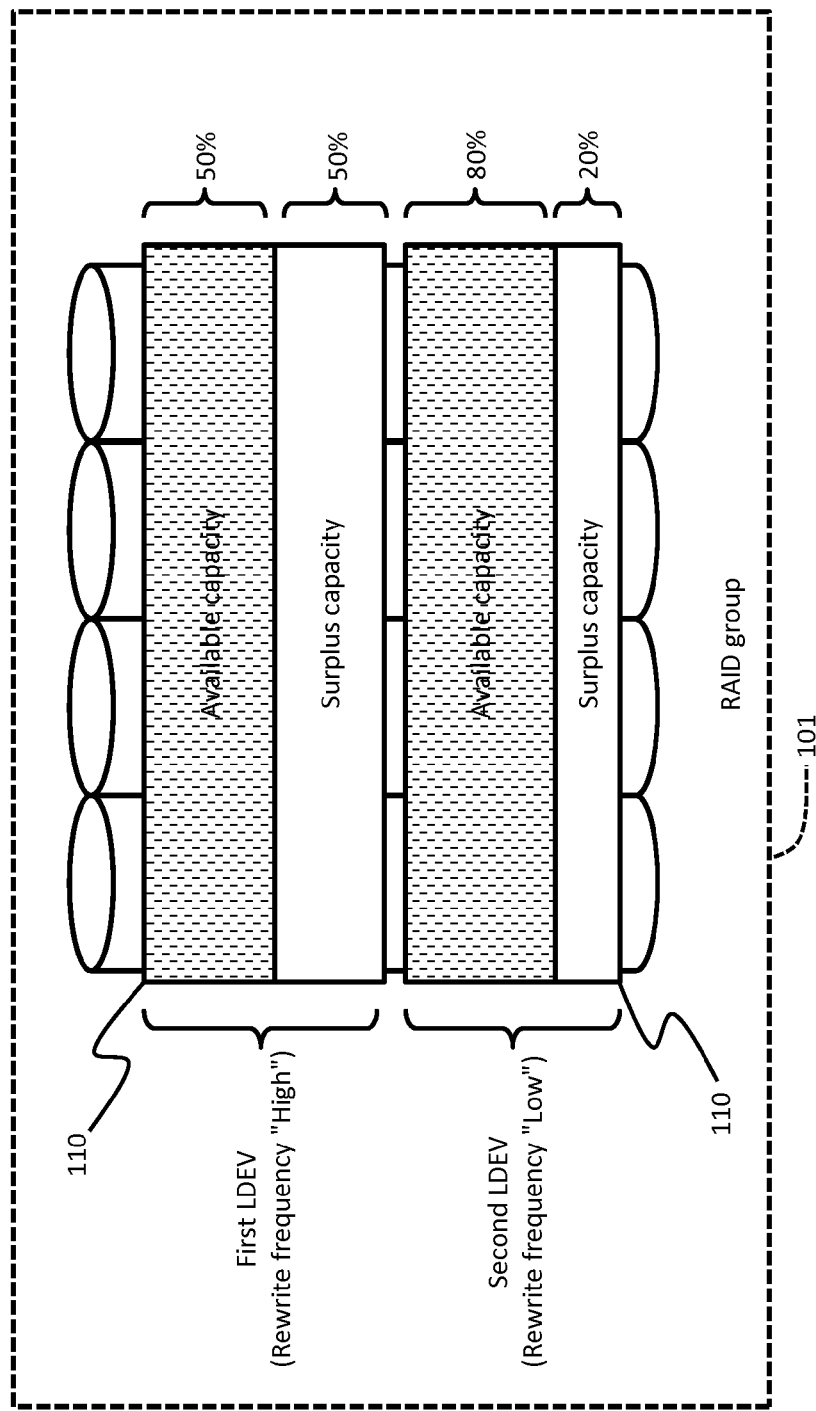
FIG. 6 is a schematic diagram illustrating a case where a surplus capacity is set to an LDEV.

FIG. 6 is a schematic diagram illustrating a case where a surplus capacity is set to an LDEV.

The storage controller 20 can divide the storage area formed by the RAID group 101 to form a plurality of LDEVs 110. For example, as illustrated in FIG. 6, the storage controller 20 divides the storage area formed by the RAID group 101 having the configuration RAID 5 of "3D+1P" to form two LDEVs (first LDEV 110 and second LDEV 110). The storage controller 20 can designate the total storage capacity of the LDEV 110 when forming the LDEV 110. The storage controller 20 provides the "available capacity" of the LDEV 110 to the host computer 11. That is, the host computer 11 regards the "available capacity" of the LDEV 110 as the capacity of the LDEV.

The storage controller 20 assumes that "(Total storage capacity of LDEV)=(Available capacity)+(Surplus capacity)" and sets the proportions of the available capacity and the surplus capacity to the total storage capacity of the LDEV 110. An amount of data up to the available capacity can be stored in the LDEV 110. In other words, an amount of data larger than the available capacity cannot be stored in the LDEV 110.

Here, although the available capacity of the LDEV 110 decreases if the surplus capacity is increased, the lifetime of the FMPKs 40 that form the LDEV 110 is extended accordingly. This is because, if the surplus capacity is increased, the number of rewrites per block of the FM chip 51 when a predetermined number of writes were executed on the LDEV 110 decreases.

Conversely, although the available capacity of the LDEV 110 increases if the surplus capacity is decreased, the lifetime of the FMPKs 40 that form the LDEV 110 decreases accordingly. This is because, if the surplus capacity is decreased, the number of rewrites per block of the FM chip 51 when a predetermined number of writes were executed on the LDEV 110 increases.

Thus, when it is expected that the rewrite frequency of the LDEV 110 is high, the lifetime of the FMPK 40 can be extended by configuring the LDEV 110 so as to have a large surplus capacity. When it is expected that the rewrite frequency of the LDEV 110 is low, a large available capacity can be secured by configuring the LDEV 110 so as to have a small surplus capacity. Here, the rewrite frequency of an LDEV may be the frequency of receiving a write request that designates the LDEV (for example, the frequency of receiving a write request per unit time).

That is, when it is desired to increase the total number of rewrites (to extend the lifetime) to the entire LDEV 110, the storage controller 20 sets the available capacity and the surplus capacity so that the difference between the available capacity and the surplus capacity of the LDEV 110 decreases to thereby configure the LDEV.

A user can set the surplus capacity when configuring the LDEV 110. The surplus capacity may be set by inputting the size of an available capacity or a surplus capacity or by inputting the proportions (for example, "50%:50%" or the like) of the available capacity and the surplus capacity to the total storage capacity of the LDEV 110.

Alternatively, a user may select whether a rewrite frequency is "High" or "Low" from the purpose of using the LDEV 110. A predetermined larger surplus capacity may be set when the rewrite frequency of "High" is selected, and a predetermined smaller surplus capacity may be set when the rewrite frequency of "Low" is selected.

Similarly to FIG. 5, the storage controller 20 may display a GUI for setting the available capacity of the LDEV 110 on the management computer 12.

Figure 7:
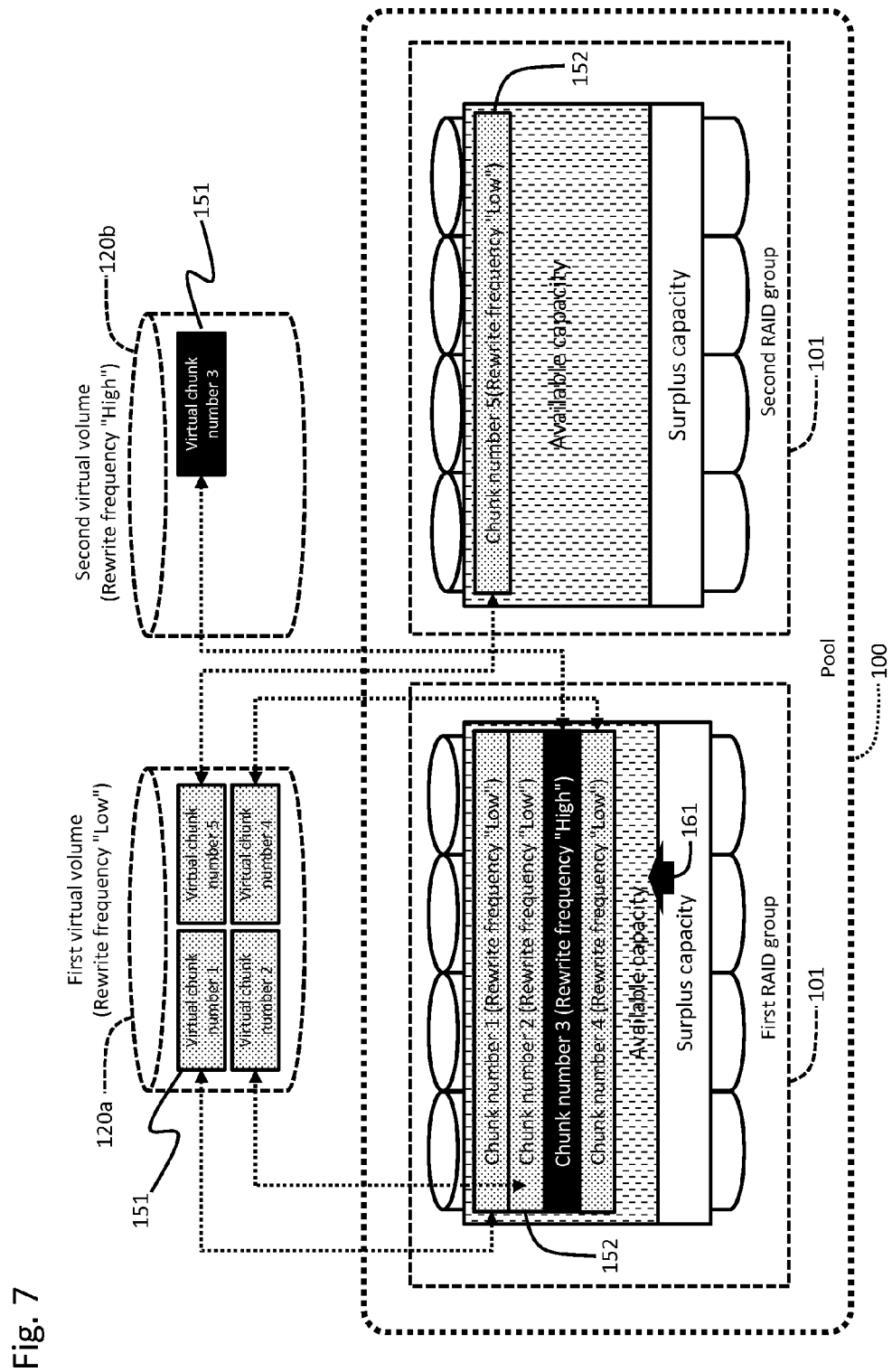
FIG. 7 is a schematic diagram illustrating a case where a surplus capacity is set to a virtual volume.

FIG. 7 is a schematic diagram illustrating a case where a surplus capacity is set based on a write request to a virtual volume. A virtual volume is a virtual logical volume configured according to Thin Provisioning and includes a plurality of virtual storage areas (virtual chunks) 151. As illustrated in FIG. 7, the storage controller 20 combines the storage areas of a plurality of RAID groups (first RAID group 101 and second RAID group 101) to form a pool 100. The pool 100 includes a plurality of chunks. A chunk is correlated with a certain partial area corresponding to the available capacity among the storage areas of the RAID groups that belong to the pool 100. That is, a chunk is not correlated with a storage area that is secured as a surplus capacity.

The storage controller 20 forms a plurality of virtual volumes (first virtual volume 120a and second virtual volume 120b), for example. When a write request is issued to the virtual volume 120, the storage controller 20 allocates a chunk 152 from the pool 100 to the write destination virtual chunk 151 in the virtual volume 120. In this way, the storage areas of the RAID groups can be used efficiently.

The storage controller 20 according to the present embodiment can set the rewrite frequency as well as the virtual volume size when generating the virtual volume 120. For example, when it is expected that the rewrite frequency of the first virtual volume 120a is low, the storage controller 20 sets the rewrite frequency of the first virtual volume 120a to "Low". For example, when it is expected that the rewrite frequency of the second virtual volume 120b is high, the storage controller 20 sets the rewrite frequency of the second virtual volume 120b to "High". Here, the rewrite frequency of a virtual volume may be the frequency of receiving a write request that designates the virtual volume (for example, the frequency of receiving a write request per unit time).

When a write request is issued to the first virtual volume 120a of which the rewrite frequency is set to "Low", the storage controller 20 allocates chunks 1, 2, 4, and 5 from the pool 100 to virtual chunks 1, 2, 4, and 5 of the first virtual volume 120a based on the size of the write data associated with the write request.

When a write request is issued to the second virtual volume 120b of which the rewrite frequency is set to "High", the storage controller 20 allocates chunk 3 from the pool 100 to virtual chunk 3 of the second virtual volume 120b based on the size of the write data associated with the write request and increases the surplus capacity of the first RAID group 101 to which the chunk 3 belongs (see symbol 161). The increase in the surplus capacity may be a predetermined proportion (for example, 30%) of the chunk size, for example. The proportion of the increase in the surplus capacity when a chunk is allocated to the virtual volume 120 of which the rewrite frequency is set to "High" may be set and changed by a user at the time of configuring the RAID group 101, the pool 100, or the virtual volume 120.

In this way, since the surplus capacity of the RAID group 101 to which a large number of chunks having the "High" rewrite frequency belongs increases, the lifetime of the FMPK 40 can be extended accordingly similarly to the case of FIG. 4.

<Function of Storage Controller>

Figure 8:
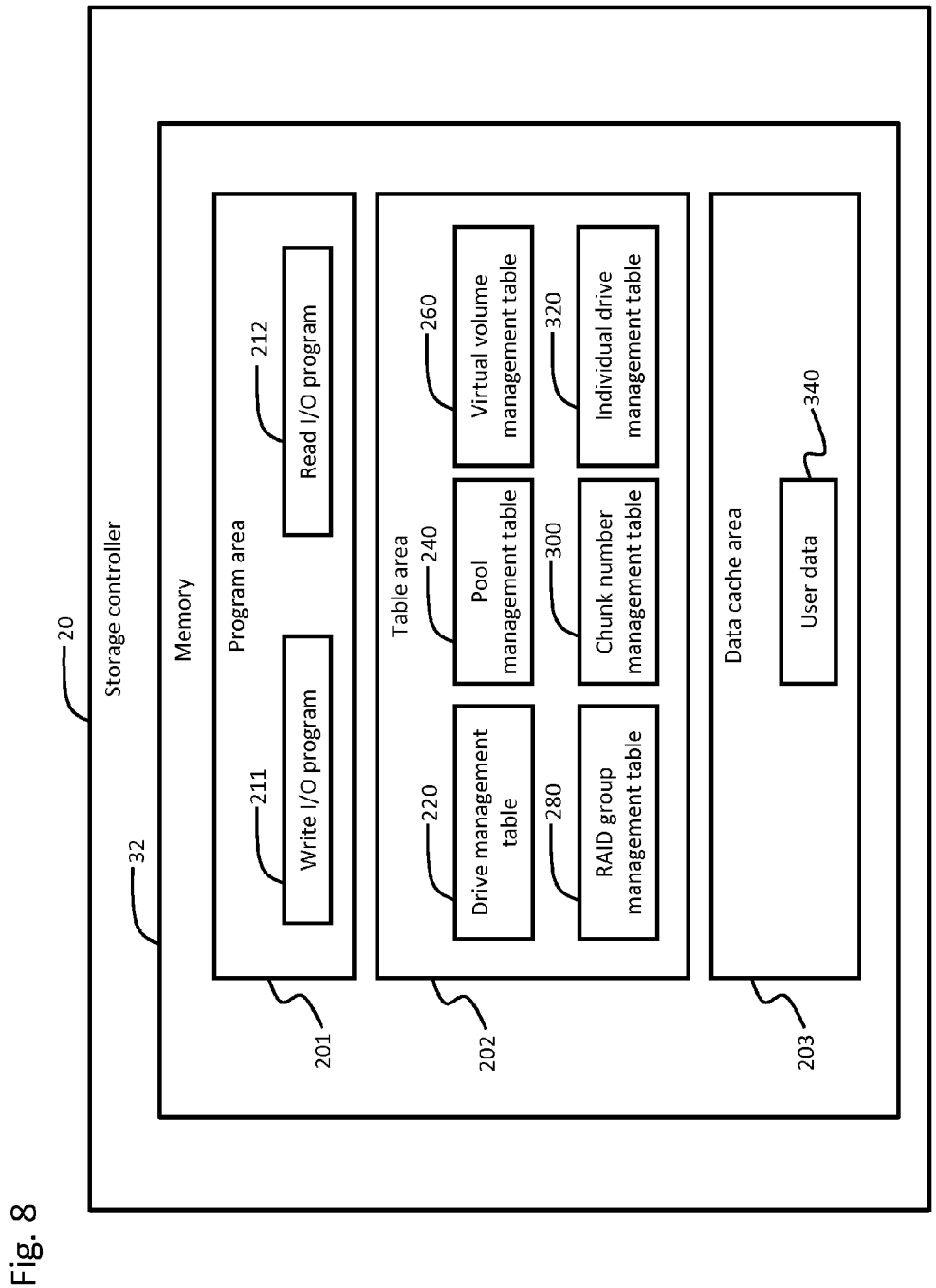
FIG. 8 illustrates an example of the functions and data of a storage controller.

FIG. 8 illustrates an example of the functions and data of the storage controller 20.

The storage controller 20 includes a write I/O program 211 and a read I/O program 212 as its functions. These programs are stored in a predetermined program area 201 on the memory 32 and are executed by the processor 31.

The write I/O program 211 is a program that processes a write request from the host computer 11. The write I/O program 211 executes a process of writing data to the FMPK 40 or the HDD 41 according to the write request from the host computer 11. The write-requested data is sometimes referred to as "write data".

The read I/O program 212 is a program that processes a read request from the host computer 11. The read I/O program 212 executes a process of reading data from the FMPK 40 or the HDD 41 according to the read request from the host computer 11 and returning the data to the host computer 11. The read-requested data is sometimes referred to as "read data".

The storage controller 20 manages user data 340. The user data 340 is stored in a predetermined data cache area 203 on the memory 32. The user data 340 is data used in the host computer 11, and specifically, is write data or read data.

The storage controller 20 manages a drive management table 220, a pool management table 240, a virtual volume management table 260, a RAID group management table 280, a chunk management table 300, and an individual drive management table 320. These tables are stored in a predetermined table area 202 on the memory 32. The details of these tables will be described below.

FIG. 9 illustrates a configuration example of the drive management table 220.

The drive management table 220 has information on the respective drives included in the storage apparatus 10. The drive management table 220 has a drive number 221, a drive type 222, a maximum capacity 223, and an available capacity 224 as data items.

The drive number 221 is information capable of uniquely identifying drives included in the storage apparatus 10.

The drive type 222 is information indicating the type of a drive corresponding to the drive number 221.

The maximum capacity 223 is information indicating a maximum logical capacity that the drive corresponding to the drive number 221 can provide. The maximum capacity 223 is basically information that is invariably determined based on a physical storage capacity of a storage medium included in a drive.

The available capacity 224 is information indicating a logical capacity that is available in the drive corresponding to the drive number 221. The available capacity is information that can be changed based on the setting of a surplus capacity described later.

For example, in FIG. 9, a drive corresponding to the drive number 221 of "3" has the drive type 222 of "FMPK", the maximum capacity 223 of "1.6 TB", and the available capacity 224 of "1 TB".

FIG. 10 illustrates a configuration example of the pool management table 240.

The pool management table 240 has information on the pools 100. The pool 100 is formed as a group of one or more logical storage areas (hereinafter referred to as "RAID areas") formed of the RAID group 101. The pool 100 is used when generating the virtual volume 120 described later. Thus, when the virtual volume 120 is not generated, the pool management table 240 may not manage a pool number 241.

The pool management table 240 has a pool number 241, a RAID group number 242, a RAID level 243, a RAID configuration 244, a drive number 245, a maximum capacity 246, and an available capacity 247 as its data items.

The pool number 241 is information capable of uniquely identifying the pools 100.

The RAID group number 242 is information capable of uniquely identifying the RAID groups 101.

The RAID level 243 is information indicating the level of a RAID group corresponding to the RAID group number 242.

The RAID configuration 244 is information indicating a configuration of a RAID group corresponding to the RAID group number 242.

The drive number 245, the maximum capacity 246, and the available capacity 247 are the same as those described above.

For example, in FIG. 10, the pool 100 corresponding to the pool number 241 of "1" is formed of three RAID groups corresponding to the RAID group numbers 242 of "1", "2" and "N". Moreover, the RAID group corresponding to the RAID group number 242 of "1" has the RAID level 243 of "5" and the RAID configuration 244 of "3D+1P". "3D+1P" indicates that a RAID group is formed of the capacity of three data drives and the capacity of one parity drive. Moreover, the RAID group corresponding to the RAID group number 242 of "1" is formed of four drives corresponding to the drive numbers 245 of "1", "2", "14" and "15".

FIG. 11 illustrates a configuration example of the chunk management table 300.

The chunk management table 300 has information on chunks. A chunk indicates a partial area of a RAID area. A chunk is used when generating the virtual volume 120.

The chunk management table 300 has a RAID group number 301, a chunk number 302, a size 303, a status 304, and a rewrite frequency 305 as its data items.

The RAID group number 301 is the same information as that described above.

The chunk number 302 is information capable of uniquely identifying chunks in a RAID area.

The size 303 is information indicating the size of a chunk corresponding to the chunk number 302.

The status 304 is information indicating whether a chunk corresponding to the chunk number 302 has been allocated to the virtual volume 120. For example, the status of a chunk that has been allocated to the virtual volume 120 is set to "Allocated" and the status of a chunk that has not been allocated to the virtual volume 120 is set to "Not allocated".

The rewrite frequency 305 is information indicating whether a chunk corresponding to the chunk number 302 has a rewrite frequency of "High" or "Low". For example, the rewrite frequency of a chunk that has been allocated to the virtual volume 120 having the rewrite frequency "High" is set to "High", and the rewrite frequency of a chunk that has been allocated to the virtual volume having the rewrite frequency "Low" is set to "Low".

For example, in FIG. 11, a RAID area corresponding to the RAID group number 301 of "1" is formed of chunks having the chunk numbers 302 of "1" to "N". Moreover, a chunk corresponding to the chunk number 302 of "1" having the RAID group number 301 of "1" has the size 303 of "1 GB" and has been "Allocated" (status 304) to the virtual volume 120 having the rewrite frequency 305 of "High". Further, a chunk corresponding to the chunk number 302 of "2" having the RAID group number 301 of "1" has been "Allocated" (status 304) to the virtual volume 120 having the rewrite frequency 305 of "Low". Further, a chunk corresponding to the chunk number 302 of "N" having the RAID group number 301 of "2" has been "Not allocated" (status 304) to any virtual volume 120.

FIG. 12 illustrates a configuration example of the virtual volume management table 260.

The virtual volume management table 260 has information on the virtual volumes 120. The virtual volume management table 260 has a virtual volume number 261, a pool number 262, a maximum virtual capacity 263, a virtual chunk number 264, a RAID group number 265, a chunk number 266, and a rewrite frequency 267 as its data items.

The virtual volume number 261 is information capable of uniquely identifying the virtual volumes 120.

The pool number 262 is the same information as that described above. The maximum virtual capacity 263 is information indicating the maximum capacity set to the virtual volume 120 corresponding to the virtual volume number 261.

The virtual chunk number 264 is information capable of uniquely identifying chunks that form the virtual volume 120 corresponding to the virtual volume number 261.

The RAID group number 265, the chunk number 266, and the rewrite frequency 267 are the same as those described above.

For example, in FIG. 13, the virtual volume 120 corresponding to the virtual volume number 261 of "1" belongs to the pool 100 corresponding to the pool number 262 of "1" and has the maximum virtual capacity 263 of "800 GB" and the rewrite frequency 267 of "High" and is formed of chunks having the virtual chunk numbers 264 of "1" to "N". Moreover, a chunk having the chunk number 266 of "1", of the RAID area corresponding to the RAID group number 265 of "1" is allocated to the virtual chunk number 264 of "1" that forms the virtual volume 120 corresponding to the virtual volume number 261 of "1".

FIG. 13 illustrates a configuration example of the individual drive management table 320.

The individual drive management table 320 has information on drives (for example, the FMPKs 40). That is, the individual drive management table 320 is configured for each drive. The individual drive management table 320 has a drive number 321, a maximum capacity 322, an available capacity 323, an LBA (Logical Block Address) 324, an LBA length 325, and a chunk number 326 as its data items.

The drive number 321, the maximum capacity 322, and the available capacity 323 are the same as those described above.

The LBA 324 is information indicating the starting address of logical blocks that form a storage area of a drive corresponding to the drive number 321.

The LBA length 325 is information indicating the size (length) of a logical block corresponding to the LBA 324.

The chunk number 326 is the same information as that described above.

For example, in FIG. 13, a drive corresponding to the drive number 321 of "3" has the maximum capacity 322 of "1.6 TB" and the available capacity 323 of "1 TB". Moreover, an area located "1 GB" (the LBA length 325) from the LBA 324 of "0" of a drive corresponding to the drive number 321 of "3" is correlated with the chunk number 326 of "1".

<Function of FMPK>

Figure 14:
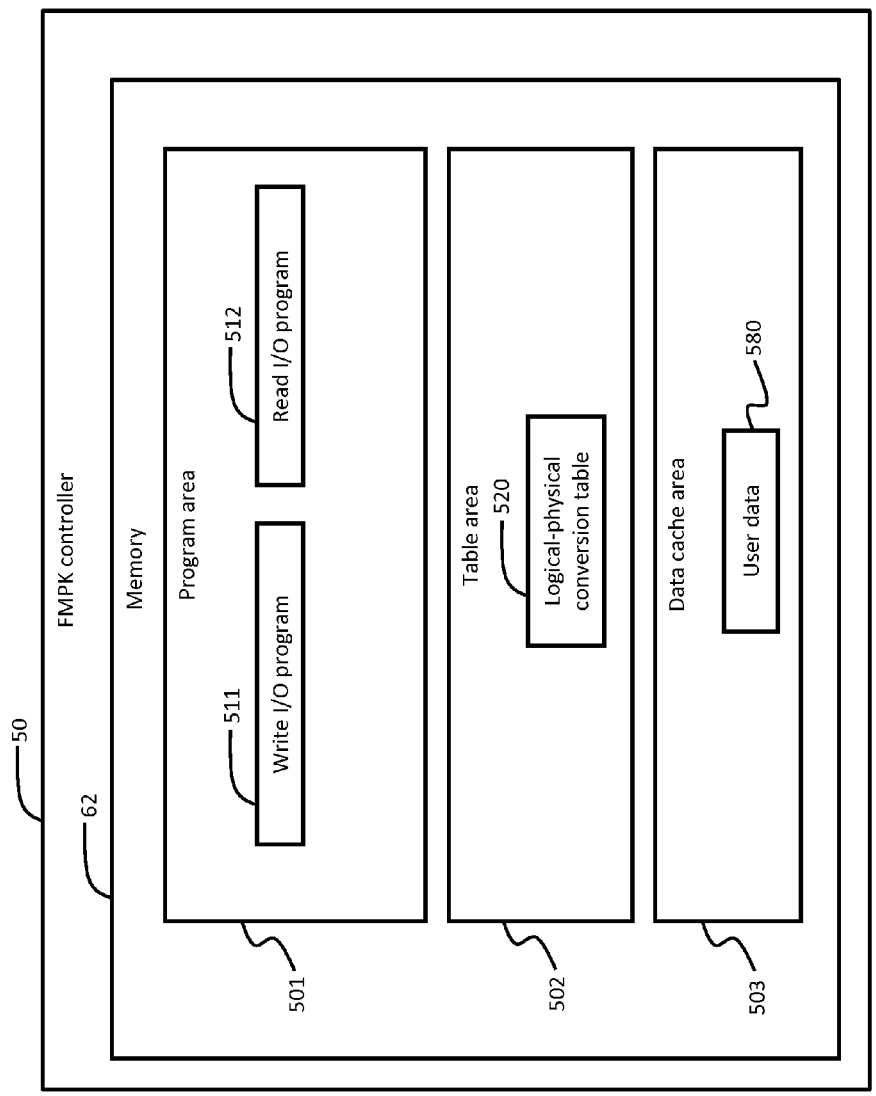
FIG. 14 illustrates an example of the functions and data of an FMPK.

FIG. 14 illustrates an example of the functions and data of the FMPK 40.

The FMPK controller 50 includes a write I/O program 511 and a read I/O program 512 as its functions. These programs are stored in a predetermined program area 501 on the memory 62 and are executed by the processor 61.

The write I/O program 511 processes a write command transmitted from the storage controller 20. Upon receiving the write command, the write I/O program 511 specifies a write destination page by referring to the logical-physical conversion table 520. Moreover, the write I/O program 511 writes data to the FM chip 51 having the write destination page.

The read I/O program 512 processes a read command transmitted from the storage controller 20. Upon receiving the read command, the read I/O program 512 specifies a read destination page by referring to the logical-physical conversion table 520. Moreover, the read I/O program 512 reads data from the FM chip 51 having a read destination page.

The storage controller 20 manages user data 580. The user data 580 is stored in a predetermined data cache area 503 on the memory 62. The user data is the cache data before write data is written to the FM chip 51, for example. The user data is the cache data before data read from the FM chip 51 is transmitted to the storage controller 20, for example.

The FMPK controller 50 manages the logical-physical conversion table 520, and the logical-physical conversion table 520 has information indicating the correspondence between a logical page and a physical page. The logical-physical conversion table 520 will be described further below.

FIG. 15 illustrates a configuration example of the logical-physical conversion table 520.

The logical-physical conversion table 520 has a LBA 561, a logical page number 562, a logical page size 563, a status 564, a block number 565, and a page number 566 as its data items.

The LBA 561 is information indicating the starting address of the logical page 562 of the FMPK 40.

The logical page number 562 is information capable of uniquely identifying a logical page corresponding to the LBA 561.

The logical page size 563 is information indicating the size of a logical page corresponding to the logical page number 562.

The status 564 is information indicating the status of a logical page corresponding to the logical page number 562. For example, the status 564 of a logical page that has been allocated to the RAID group 101, the LDEV 110, or the pool 100 is set to "Valid" and the status 564 of a logical page that has not been allocated to any one of the above is set to "Invalid". Moreover, the status 564 of a logical page secured as a surplus capacity is set to "Not available".

The block number 565 is information capable of uniquely identifying a physical block to which a physical page corresponding to the logical page number 562 belongs.

The page number 566 is information capable of uniquely identifying a physical page corresponding to the logical page number 561.

For example, in FIG. 15, logical pages corresponding to the LBAs 561 of "8192" to "16383" have the logical page number 562 of "2", the size 563 of "16 KB", and the status 564 of "Valid". Moreover, the logical pages are correlated with a physical page having the page number 566 of "2", and the physical page belongs to a block having the block number 565 of "2".

<Process of Setting Surplus Capacity to RAID Group>

This process corresponds to a case where a surplus capacity is set to the RAID group illustrated in FIG. 4.

Figure 16:
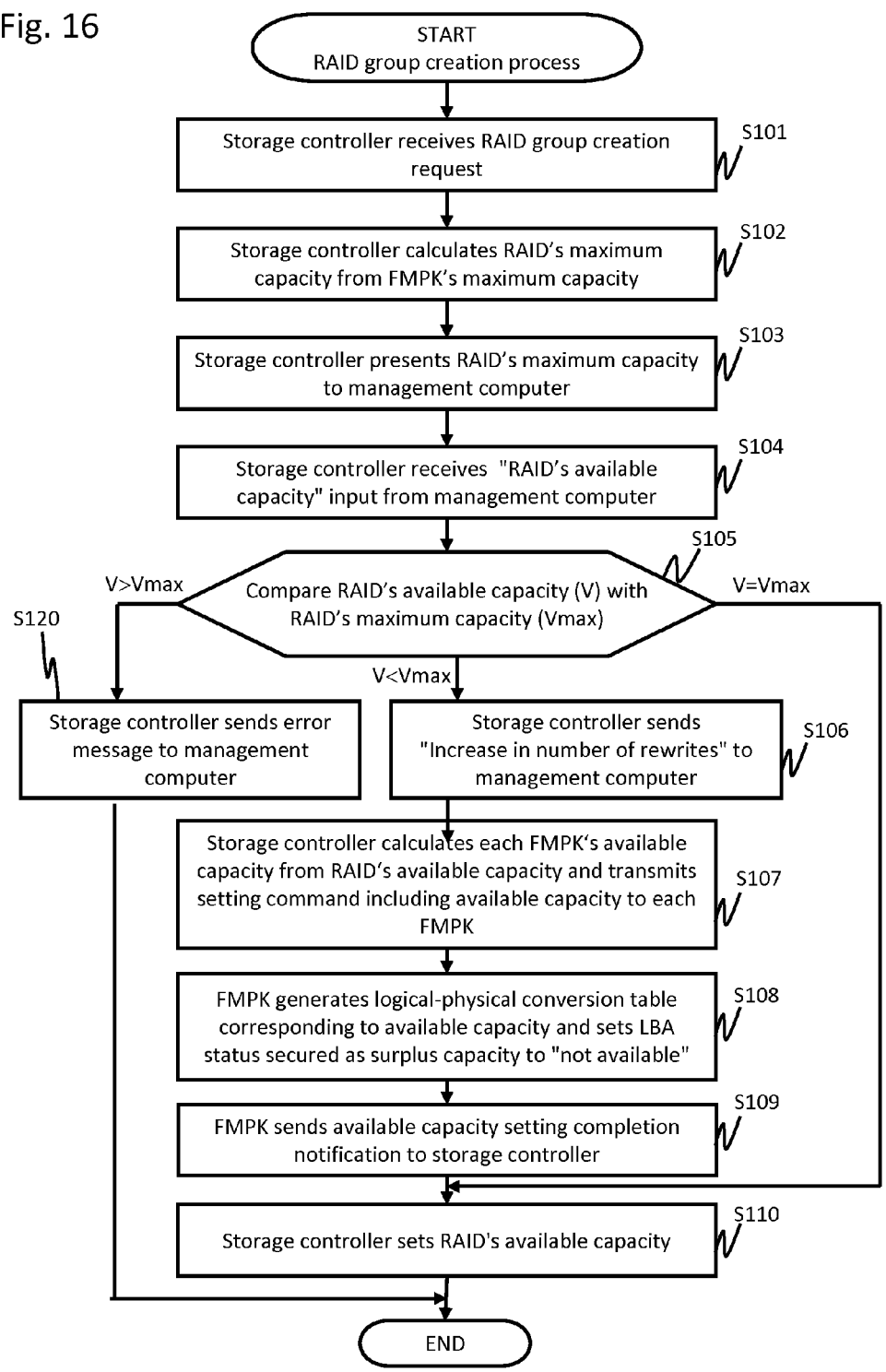
FIG. 16 is a flowchart illustrating an example of a RAID group creation process.

FIG. 16 is a flowchart illustrating an example of a RAID group creation process.

The storage controller 20 receives a RAID group creation request from the management computer 12 (S101).

The storage controller 20 calculates a maximum capacity (hereinafter referred to as a "RAID's maximum capacity") of a RAID group using the maximum capacity of the FMPK 40.

The storage controller 20 presents the RAID's maximum capacity to the management computer 12 (S103). The storage controller 20 may generate a GUI that includes the RAID's maximum capacity and present the GUI to the management computer 12.

The storage controller 20 receives an available capacity (hereinafter referred to as a "RAID's available capacity") of the RAID group, input by the user from the management computer 12 (S104).

The storage controller 20 compares the input RAID's available capacity (V) with the RAID's maximum capacity (Vmax) (S105).

In the case of "(RAID's available capacity (V))>(RAID's maximum capacity (Vmax))" (S105: V>Vmax), the storage controller 20 sends an error message to the management computer 12 (S120) and ends the process (END).

In the case of "(RAID's available capacity (V))=(RAID's maximum capacity (Vmax))" (S105: V=Vmax), the storage controller 20 proceeds to step S110 described later.

In the case of "(RAID's available capacity (V))<(RAID's maximum capacity (Vmax))" (S105: V<Vmax), the storage controller 20 generates a GUI that includes "Increase in the number of rewrites" and sends the GUI to the management computer 12 (S106).

The storage controller 20 calculates the available capacities of the respective FMPKs 40 from the RAID's available capacity. Moreover, the storage controller 20 transmits a setting command for setting an available capacity to the respective FMPKs 40 (S107). For example, when the RAID's available capacity is set to 80% of the RAID's maximum capacity, the storage controller 20 generates a setting command indicating that 80% of the maximum capacity of the FMPK 40 is to be set as the available capacity and transmits the setting command to the respective FMPKs 40.

The FMPK controller 50 generates the logical-physical conversion table 520 corresponding to the available capacity included in the setting command (S108). That is, the FMPK controller 50 changes the status of the LBA corresponding to the available capacity in the logical-physical conversion table 520 from "Invalid" to "Valid". Further, the FMPK controller 50 sets the status of the LBA corresponding to the surplus capacity in the logical-physical conversion table 520 to "Not available". Here, the FMPK controller 50 may set the status of LBAs to "Not available" in descending order of LBAs.

The FMPK 40 sends an available capacity setting completion notification to the storage controller 20 (S109).

Upon receiving the setting completion notification from the respective FMPKs 40, the storage controller 20 sets the RAID's available capacity (S110) and ends the process (END).

In the above process, the setting command transmitted to the FMPK 40 may include the proportions of the available capacity and the surplus capacity, may include the size of the available capacity secured in the FMPK 40, and may include the size of the surplus capacity set to the FMPK 40.

<Process of Setting Surplus Capacity to LDEV>

This process corresponds to a case where a surplus capacity is set to the LDEV illustrated in FIG. 6.

Figure 17:
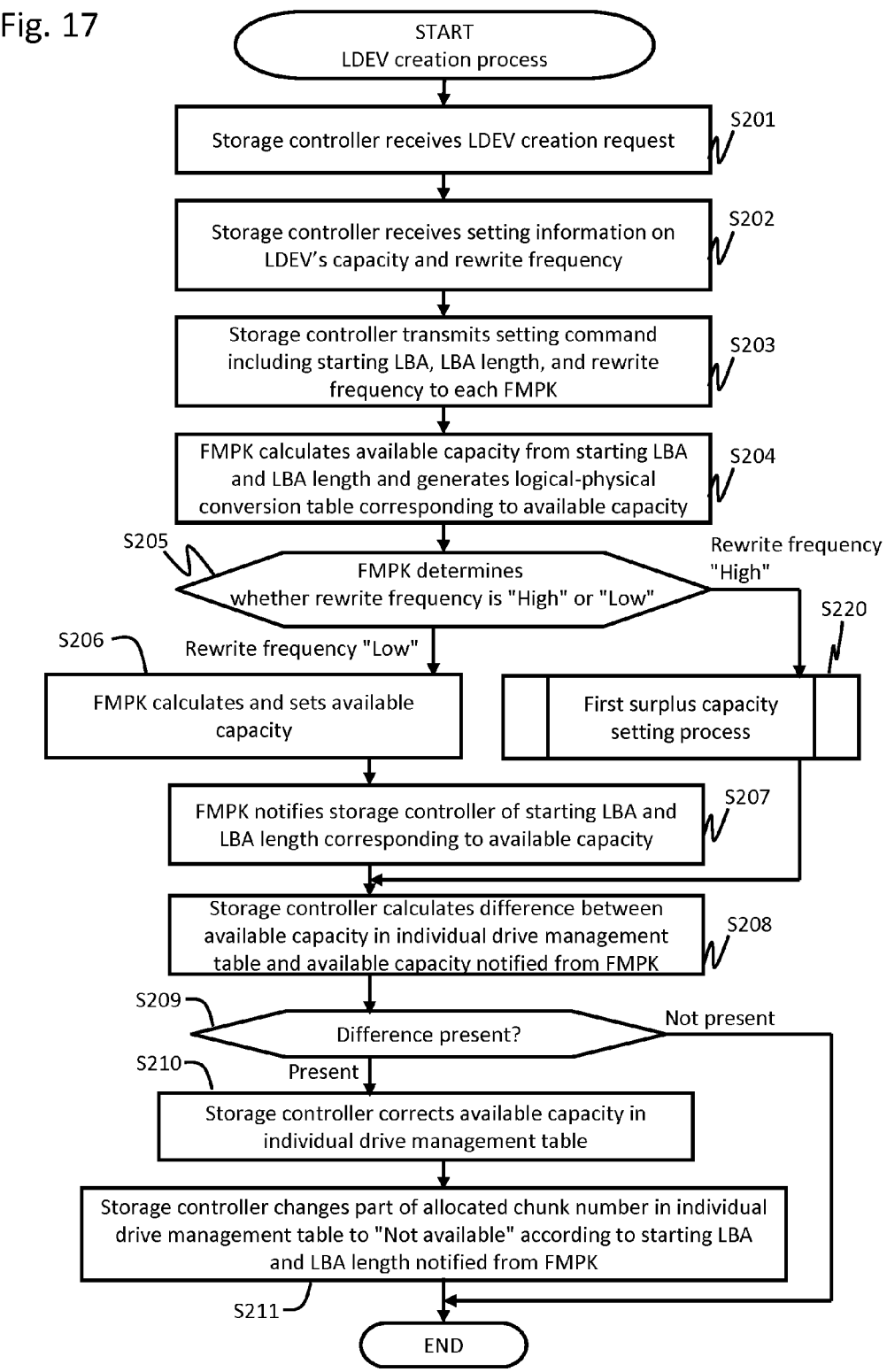
FIG. 17 is a flowchart illustrating a process example related to creation of an LDEV.

FIG. 17 is a flowchart illustrating a process example related to creation of an LDEV.

The storage controller 20 receives an LDEV creation request from the management computer 12 (S201).

The storage controller 20 receives setting information on an LDEV's capacity and a rewrite frequency from the management computer 12 (S202). "High" or "Low" is set to the rewrite frequency.

The storage controller 20 transmits a setting command including a starting LBA, a LBA length, and a rewrite frequency to the respective FMPKs 40 (S203).

The FMPK 40 having received the setting command calculates an available capacity from the starting LBA and the LBA length and generates the logical-physical conversion table 520 corresponding to the available capacity (S204). That is, the FMPK 40 changes the status of a LBA corresponding to the available capacity in the logical-physical conversion table 520 from "Invalid" to "Valid".

The FMPK 40 determines whether the rewrite frequency is "High" or "Low" (S205).

When the rewrite frequency is "High" (S205: Rewrite frequency "Low"), the FMPK 40 executes a first surplus capacity setting process described later (S220) and proceeds to step S208.

When the rewrite frequency is "Low" (S205: Rewrite frequency "High"), the FMPK 40 calculates and sets the available capacity (S206).

The FMPK 40 notifies the storage controller 20 of the starting LBA and the LBA length of the area set as the available capacity (S207).

The storage controller 20 calculates a difference between the available capacity in the individual drive management table 320 corresponding to the FMPK 40 and the available capacity notified from the FMPK 40 (S208).

When the difference is not present (S209: Not present), the storage controller 20 ends the process (END).

When the difference is present (S209: Present), the storage controller 20 corrects the available capacity in the individual drive management table 320 to the available capacity notified from the FMPK 40 (S210).

The storage controller 20 changes part of the chunk number in the individual drive management table 320 to "Not available" according to the starting LBA and the LBA length notified from the FMPK 40 (S211) and ends the process (END).

In the above process, the setting command transmitted to the FMPK 40 may include the proportions of the available capacity and the surplus capacity, may include the size of the available capacity secured in the FMPK 40, and may include the size of the surplus capacity set to the FMPK 40.

Figure 18:
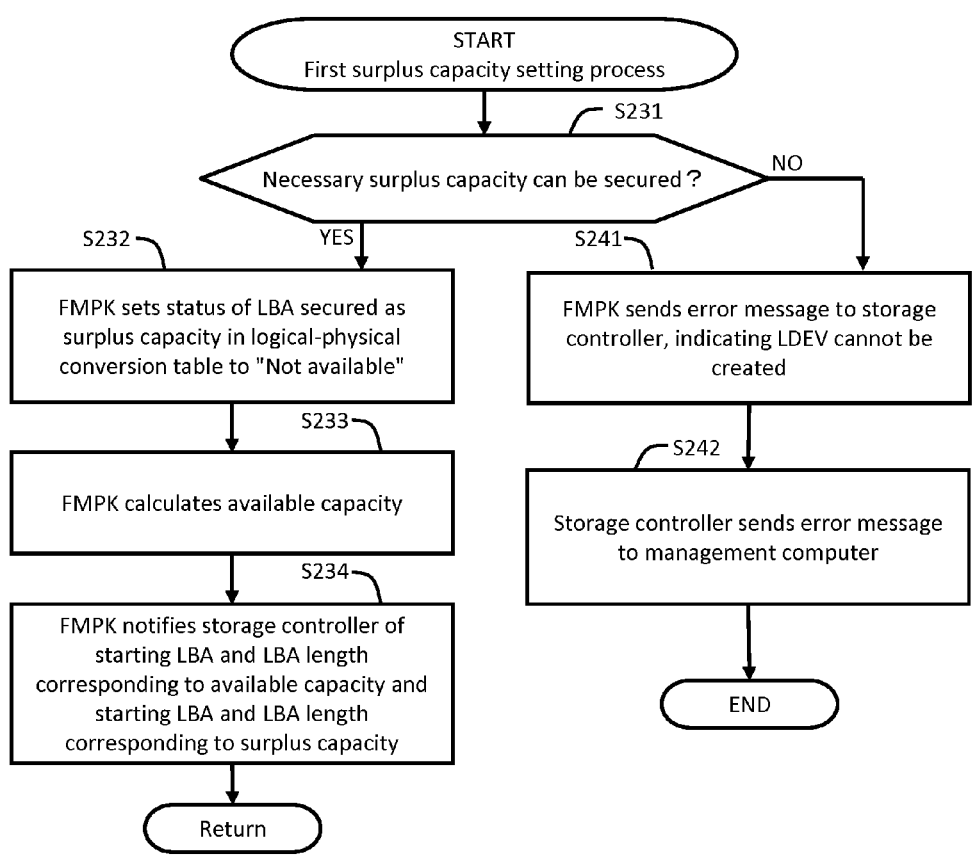
FIG. 18 is a flowchart illustrating the details of a first surplus capacity setting process of FIG. 17.

FIG. 18 is a flowchart illustrating the details of the first surplus capacity setting process of FIG. 17.

The FMPK controller 50 determines whether a necessary surplus capacity can be secured (S231). The surplus capacity necessary for the rewrite frequency "High" may be a predetermined proportion (for example, 30%) of the available capacity secured in the FMPK 40 and may be designated from the storage controller 20.

When the necessary surplus capacity cannot be secured (S231: NO), the FMPK controller 50 sends an error message to the storage controller 20, indicating that an LDEV cannot be created because the surplus capacity cannot be secured (S241). The storage controller 20 having received the error message sends an error message to the management computer 12, indicating that it has failed in creating an LDEV (S242) and ends the process (END).

When the necessary surplus capacity can be secured (S231: YES), the FMPK controller 50 sets the status of a LBA secured as a surplus capacity, in the logical-physical conversion table 520 to "Not available" (S232). Here, the FMPK controller 50 may set the status of LBAs to "Not available" in descending order of LBAs.

The FMPK controller 50 calculates the available capacity (S233). Moreover, the FMPK controller 50 notifies the storage controller 20 of the starting LBA and the LBA length of an area set as the available capacity and the starting LBA and the LBA length of an area set as the surplus capacity (S234) and proceeds to step S208 of FIG. 17 (Return).

<Process of Setting Surplus Capacity when Writing to Virtual Volume>

This process corresponds to a case where a surplus capacity is set based on a write request to the virtual volume illustrated in FIG. 7.

Figure 19:
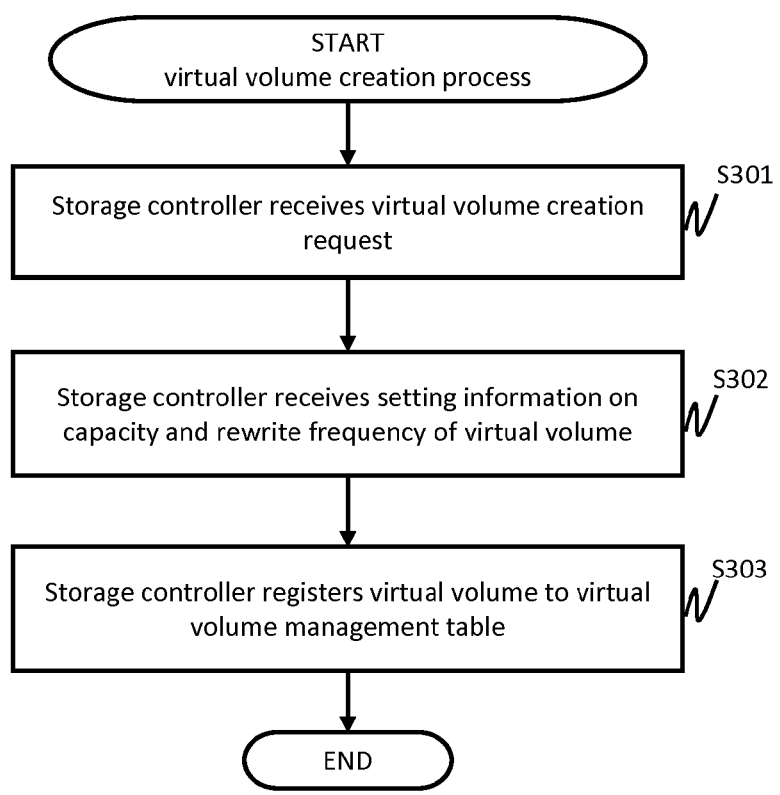
FIG. 19 is a flowchart illustrating an example of a virtual volume creation process.

FIG. 19 is a flowchart illustrating an example of a virtual volume creation process.

The storage controller 20 receives a virtual volume creation request from the management computer 12 (S301).

The storage controller 20 receives setting information on the capacity and the rewrite frequency of a virtual volume (S302). The storage controller 20 registers a new virtual volume to the virtual volume management table 260 (S303) and ends the process (END).

Figure 20:
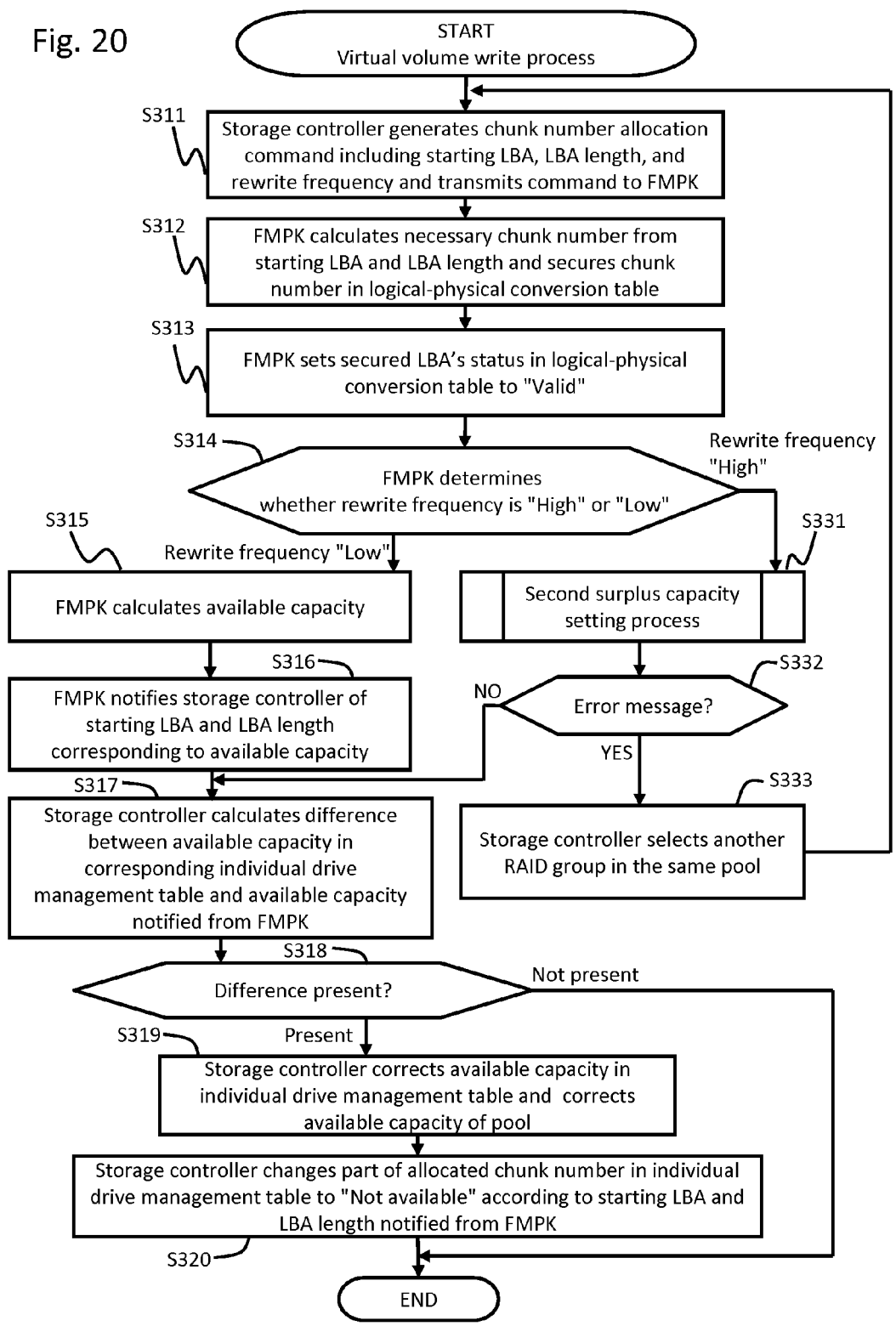
FIG. 20 is a flowchart illustrating an example of a virtual volume write process.

FIG. 20 is a flowchart illustrating an example of a virtual volume write process.

Upon receiving a write request to a virtual volume from the host computer 11, the storage controller 20 generates a chunk allocation command including a starting LBA, a LBA length, and a rewrite frequency and transmits the command to the FMPK 40 (S311). Here, the rewrite frequency corresponds to the setting of the virtual volume corresponding to the received write request.

The FMPK controller 50 calculates necessary chunks from the starting LBA and the LBA length and secures the chunks in the logical-physical conversion table 520 (S312).

The FMPK controller 50 changes the status of the secured LBAs, in the logical-physical conversion table 520 from "Invalid" to "Valid" (S313).

The FMPK controller 50 determines whether the rewrite attribute of the chunk is "High" or "Low" (S314).

When the rewrite frequency is "High", the second surplus capacity setting process described later is executed (S331). Moreover, the storage controller 20 determines whether an error message has been sent from the FMPK 40 (S332). When a success message is sent (S332: NO), the storage controller 20 proceeds to step S317. When an error message is sent (S332: YES), the storage controller 20 selects another RAID group in the same pool 100 (S333) and returns to step S311. This is because there is a possibility that a surplus capacity can be secured in another RAID group.

When the rewrite frequency is "Low", the FMPK controller 50 calculates the available capacity. Moreover, the FMPK controller 50 notifies the storage controller 20 of the starting LBA and the LBA length of an area set as the available capacity (S316).

The storage controller 20 calculates a difference between the available capacity in the corresponding individual drive management table 320 and the available capacity notified from the FMPK 40 (S317).

When the difference is not present (S318: Not present), the storage controller 20 ends the process (END).

When the difference is present (S318: Present), the storage controller 20 corrects the available capacity in the individual drive management table 320 and corrects the available capacity of the pool 100 (S319).

The storage controller 20 changes part of the chunk number in the individual drive management table 320 to "Not available" according to the starting LBA and the LBA length notified from the FMPK 40 (S320) and ends the process (END).

In the above process, the chunk allocation command transmitted to the FMPK 40 may include the proportion of the surplus capacity to the chunk size and may include the size of the surplus capacity set to the FMPK 40.

Figure 21:
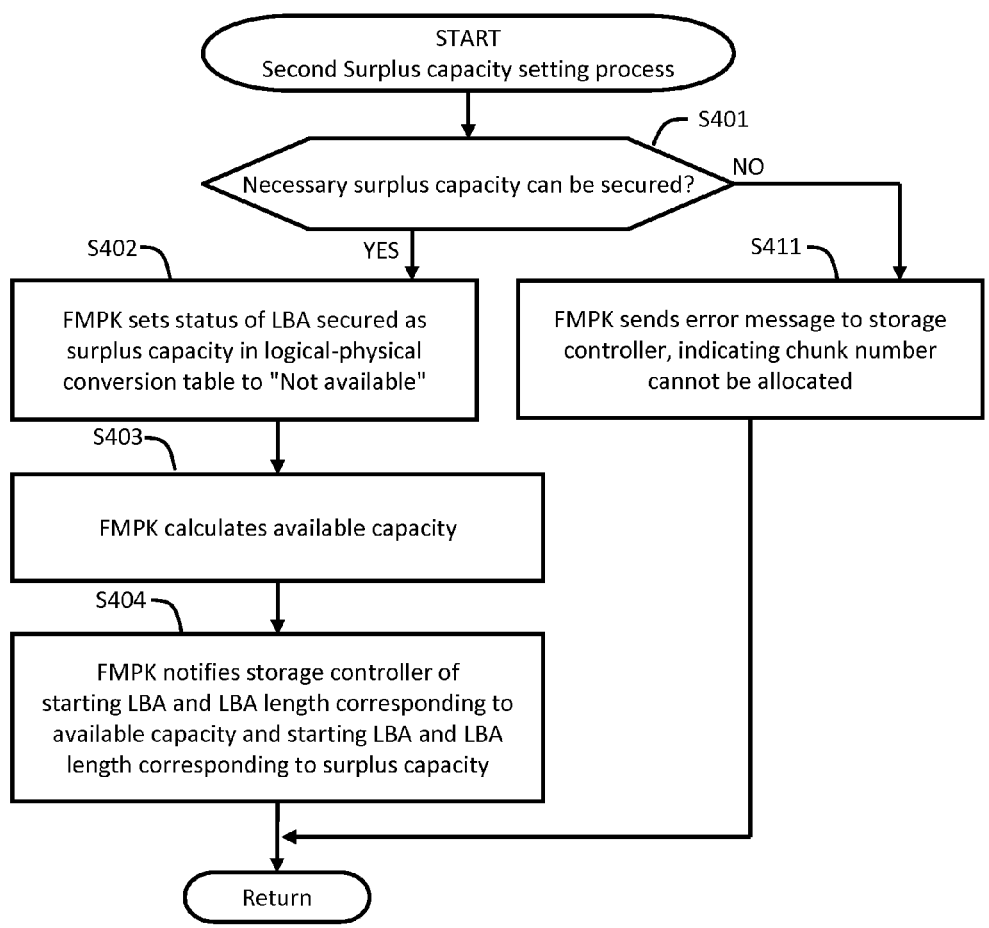
FIG. 21 is a flowchart illustrating the details of a second surplus capacity setting process of FIG. 20.

FIG. 21 is a flowchart illustrating the details of the second surplus capacity setting process of FIG. 20.

The FMPK controller 50 determines whether a necessary surplus capacity can be secured (S401). The surplus capacity necessary for the rewrite frequency "High" may be a predetermined proportion (for example, 30%) of the chunk size and may be designated from the storage controller 20.

When the necessary surplus capacity cannot be secured (S401: NO), the FMPK controller 50 sends an error message to the storage controller 20, indicating that a chunk cannot be allocated to the RAID group because the surplus capacity cannot be secured (S411) and proceeds to step S332 of FIG. 20. That is, a determination result of "YES" is obtained in step S332 of FIG. 20.

When the necessary surplus capacity can be secured (S401: YES), the FMPK controller 50 sets the status of a LBA secured as a surplus capacity, in the logical-physical conversion table 520 to "Not available" (S402). Here, the FMPK controller 50 may set the status of LBAs to "Not available" in descending order of LBAs. That is, the surplus capacity of the RAID group to which a chunk having the rewrite frequency "High" has been allocated increases.

The FMPK controller 50 calculates the available capacity (S403). Moreover, the FMPK controller 50 notifies the storage controller 20 of the starting LBA and the LBA length of an area set as the available capacity and the starting LBA and the LBA length of an area set as the surplus capacity and proceeds to step S332 of FIG. 20. That is, a determination result of "NO" is obtained in step S332 of FIG. 20.

In the above embodiment, the FMPK controller 50 determines and manages the range of available LBAs (the range of unavailable LBAs) in the logical-physical conversion table 520 managed by the FMPK controller based on an instruction from the storage controller 20. However, the storage controller 20 may determine and manage the range of available LBAs (the range of unavailable LBAs) of the respective FMPKs and may designates only the range of available LBAs of the FMPK as the write destination. In this way, the same object as the above can be attained.

The embodiments of the present invention are examples for describing the present invention, and the scope of the present invention is not limited to these embodiments. A person skilled in the art can implement the present invention in various forms without departing from the spirit of the present invention.

For example, the present invention may be implemented in the following embodiments.

The storage controller 20 generates a virtual volume. However, the storage controller 20 does not set a rewrite frequency of the virtual volume in advance. Moreover, the storage controller 20 measures the write frequency of each chunk 152 allocated to the virtual chunk 151 of the virtual volume. The storage controller 20 sets the rewrite frequency 305 of the chunk 152 of which the measured write frequency exceeds a threshold, in the chunk management table 300 to "High" and sets the rewrite frequency 305 of the chunk 152 of which the measured write frequency is equal to or lower than the threshold to "Low". The storage controller 20 increases the surplus capacity as the number of chunks having the rewrite frequency 305 of "High" increases.

According to the above process, even when the rewrite frequency of a virtual volume is not set in advance, the storage controller 20 can secure an appropriate surplus capacity according to the rewrite frequency of the RAID group.

REFERENCE SIGNS LIST

1 Storage system
10 Storage apparatus
20 Storage controller
40 FMPK
50 FMPK controller

The invention claimed is:

1. A storage system comprising:
  a storage medium including a plurality of physical storage areas each having an upper limit number of rewrites, and a medium controller that controls I/O (input/output) of data to/from the plurality of physical storage areas; and
  a storage controller connected to the storage medium, wherein
    when data is erased from each physical storage area in order to rewrite data stored therein, the number of rewrites increases and the physical storage area is regarded as a vacant physical storage area,
    when any of the physical storage areas is not allocated to a write destination logical storage area among a plurality of logical storage areas or when a vacant area in which write target data can be stored is not present in a physical storage area allocated to the write destination logical storage area, the medium controller allocates a vacant physical storage area among the plurality of physical storage areas to the write destination logical storage area and writes the write target data to the allocated vacant physical storage area, the plurality of logical storage areas include an available logical area group determined based on a relationship between an available capacity of a logical storage capacity and a rewrite frequency of the plurality of physical storage areas, the logical storage capacity is a total capacity of the plurality of logical storage areas, the available logical area group is one or more logical storage areas that can be used as the write destination logical storage area among the plurality of logical storage areas, and the available capacity is a capacity of an available logical area group which is one or more logical storage areas that can be used as the write destination logical storage area among the plurality of logical storage areas, wherein the medium controller manages the plurality of logical storage areas and the available logical area group in correlation, wherein the medium controller determines the available logical area group from the plurality of logical storage areas based on a proportion of the available capacity to the logical storage capacity included in a setting command transmitted from the storage controller to the medium controller, wherein the storage controller provides, to an external apparatus, a virtual volume which is a virtual logical volume configured according to Thin Provisioning and is formed of a plurality of virtual storage areas, and receives a write request that designates an address of a write destination virtual area in the virtual volume, wherein a logical storage area allocated to the write destination virtual area within the available logical area group is the write destination logical storage area, and wherein when allocating the logical storage area to a virtual volume having a high rewrite frequency, the medium controller is configured to decrease the available capacity, wherein decreasing the available capacity extends a lifetime of the physical storage area associated with the logical storage area allocated to the virtual volume.

2. The storage system according to claim 1, wherein the storage controller provides a logical volume to an external apparatus, and receives a write request that designates an address of a write destination area in the logical volume, a logical storage area corresponding to the write destination area within the available logical area group is the write destination logical storage area, and the available capacity when the logical volume has a high rewrite frequency is smaller than the available capacity when the logical volume has a low rewrite frequency.

3. The storage system according to claim 1, wherein the storage controller provides a logical volume to an external apparatus, and receives a write request that designates an address of a write destination area in the logical volume, a logical storage area corresponding to the write destination area within the available logical area group is the write destination logical storage area, the storage controller receives an input of a logical volume capacity desired by a user, and as the control, the storage controller:

based on the relationship, calculates information on a maximum number of rewrites when the logical volume capacity desired by the user is used as the available capacity; and outputs the calculated information.

4. The storage system according to claim 1, further comprising a management computer that manages the storage controller, wherein the storage controller provides a logical volume to an external apparatus, and receives a write request that designates an address of a write destination area in the logical volume, a logical storage area corresponding to the write destination area within the available logical area group is the write destination logical storage area, and the management computer:

receives an input of a logical volume capacity desired by a user;

based on the relationship, calculates information on a maximum number of rewrites when the logical volume capacity desired by the user is used as the available capacity; and outputs the calculated information.

5. The storage system according to claim 1, wherein the medium controller manages the plurality of logical storage areas and the available logical area group in correlation.

6. The storage system according to claim 5, wherein the storage controller transmits an allocation command to the medium controller, and the medium controller determines the available logical area group from the plurality of logical storage areas based on the allocation command.

7. The storage system according to claim 6, wherein the allocation command includes information on a rewrite frequency of the virtual volume, and the medium controller determines the available logical area group according to the information on the rewrite frequency included in the allocation command.

8. A data storing method in a storage apparatus including: a storage medium including a plurality of physical storage areas each having an upper limit number of rewrites, and a medium controller that controls I/O (input/output) of data to/from the plurality of physical storage areas; and a storage controller connected to the storage medium, the method comprising:

increasing, when data is erased from each physical storage area in order to rewrite data stored therein, the number of rewrites and regarding the physical storage area as a vacant physical storage area; and allowing, when any of the physical storage areas is not allocated to a write destination logical storage area among a plurality of logical storage areas or when a vacant area in which write target data can be stored is not present in a physical storage area allocated to the write destination logical storage area, the medium controller to allocate a vacant physical storage area among the plurality of physical storage areas to the write destination logical storage area and write the write target data to the allocated vacant physical storage area, wherein the plurality of logical storage areas include an available logical area group determined based on a relationship between an available capacity of a logical storage capacity and a rewrite frequency of the plurality of physical storage areas, the logical storage capacity is a total capacity of the plurality of logical storage areas, the available logical area group is one or more logical storage areas that can be used as the write destination logical storage area among the plurality of logical storage areas, and the available capacity is a capacity of an available logical area group which is one or more logical storage areas that can be used as the write destination logical storage area among the plurality of logical storage areas, and wherein the method further comprises:
managing the plurality of logical storage areas and the available logical area group in correlation; and determining the available logical area group from the plurality of logical storage areas based on a proportion of the available capacity to the logical storage capacity included in a setting command transmitted from the storage controller to the medium controller, wherein the storage controller provides, to an external apparatus, a virtual volume which is a virtual logical volume configured according to Thin Provisioning and is formed of a plurality of virtual storage areas, and receives a write request that designates an address of a write destination virtual area in the virtual volume, wherein a logical storage area allocated to the write destination virtual area within the available logical area group is the write destination logical storage area, and wherein when allocating the logical storage area to a virtual volume having a high rewrite frequency, the medium controller is configured to decrease the available capacity, wherein decreasing the available capacity extends a lifetime of the physical storage area associated with the logical storage area allocated to the virtual volume.

* * * * *